United States Patent
Chai et al.

(10) Patent No.: US 7,889,684 B2
(45) Date of Patent: Feb. 15, 2011

(54) METHOD FOR MANAGING A TERMINAL DEVICE

(75) Inventors: Xiaoqian Chai, Shenzhen (CN); Xiaoyi Dong, Shenzhen (CN); Hai Shen, Shenzhen (CN); Jie Tang, Shenzhen (CN); Qi Shu, Shenzhen (CN); Kepeng Li, Shenzhen (CN); Jiangshui He, Shenzhen (CN); Hongtao Gao, Shenzhen (CN); Jianzhang Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 324 days.

(21) Appl. No.: 11/626,477

(22) Filed: Jan. 24, 2007

(65) Prior Publication Data

US 2007/0165654 A1    Jul. 19, 2007

Related U.S. Application Data

(63) Continuation of application No. PCT/CN2006/001869, filed on Jul. 27, 2006.

(30) Foreign Application Priority Data

Oct. 13, 2005  (CN)  .................. 2005 1 0112683
Dec. 23, 2005  (CN)  .................. 2005 1 0135008

(51) Int. Cl.
*H04Q 11/00*     (2006.01)

(52) U.S. Cl. ............. 370/259; 379/207.02; 379/201.05; 379/203.01; 379/207.13; 709/225; 709/224; 709/244

(58) Field of Classification Search ........................ None
See application file for complete search history.

(56) References Cited

U.S. PATENT DOCUMENTS

| 5,315,057 | A | * | 5/1994 | Land et al. ..................... 84/601 |
| 5,404,528 | A | * | 4/1995 | Mahajan ..................... 719/320 |
| 6,389,464 | B1 | * | 5/2002 | Krishnamurthy et al. .... 709/220 |
| 6,564,055 | B1 | * | 5/2003 | Hronek ....................... 455/433 |

(Continued)

FOREIGN PATENT DOCUMENTS

CN        1543251 A       11/2004

(Continued)

OTHER PUBLICATIONS

PCT International Preliminary Report on Patentability including the PCT Written Opinion of the International Searching Authority for International Application No. PCT/CN2006001869, dated Oct. 26, 2006, 4 pgs.

(Continued)

*Primary Examiner*—Pankaj Kumar
*Assistant Examiner*—Ajay P Cattungal
(74) *Attorney, Agent, or Firm*—Finnegan, Henderson, Farabow, Garrett & Dunner LLP

(57) ABSTRACT

A method for managing a terminal device includes: setting management commands; sending the management commands to a terminal device; and obtaining executed results of the management commands from the terminal device. Another method for managing a terminal device, comprising: setting management commands; configuring a terminal device with the management commands; and obtaining executed results of the management commands from the terminal device.

19 Claims, 9 Drawing Sheets

U.S. PATENT DOCUMENTS

| | | | | |
|---|---|---|---|---|
| 6,650,902 | B1* | 11/2003 | Richton | 455/456.3 |
| 6,671,757 | B1* | 12/2003 | Multer et al. | 710/100 |
| 6,676,022 | B1* | 1/2004 | Guthery et al. | 235/492 |
| 7,072,987 | B2* | 7/2006 | Jurisch et al. | 709/249 |
| 7,496,328 | B2* | 2/2009 | Slotznick | 455/3.05 |
| 2001/0055951 | A1* | 12/2001 | Slotznick | 455/41 |
| 2002/0059325 | A1* | 5/2002 | Beizer et al. | 707/203 |
| 2002/0099661 | A1* | 7/2002 | Kii et al. | 705/51 |
| 2002/0112047 | A1* | 8/2002 | Kushwaha et al. | 709/223 |
| 2003/0028592 | A1* | 2/2003 | Ooho et al. | 709/203 |
| 2004/0255017 | A1* | 12/2004 | Jurisch et al. | 709/223 |
| 2005/0027841 | A1* | 2/2005 | Rolfe | 709/223 |
| 2005/0055397 | A1* | 3/2005 | Zhu et al. | 709/200 |
| 2005/0060402 | A1* | 3/2005 | Oyadomari et al. | 709/224 |
| 2005/0079869 | A1* | 4/2005 | Khalil et al. | 455/435.1 |
| 2005/0182697 | A1* | 8/2005 | Rao | 705/28 |
| 2005/0210249 | A1* | 9/2005 | Lee et al. | 713/168 |
| 2005/0216419 | A1* | 9/2005 | Lee et al. | 705/59 |
| 2005/0282533 | A1* | 12/2005 | Draluk et al. | 455/418 |
| 2006/0026228 | A1* | 2/2006 | Kim | 709/202 |
| 2006/0031449 | A1* | 2/2006 | Hallamaa et al. | 709/223 |
| 2006/0053447 | A1* | 3/2006 | Krzyzanowski et al. | 725/40 |
| 2006/0246998 | A1* | 11/2006 | Schneier et al. | 463/17 |
| 2007/0047782 | A1* | 3/2007 | Hull et al. | 382/124 |
| 2007/0093243 | A1* | 4/2007 | Kapadekar et al. | 455/419 |

FOREIGN PATENT DOCUMENTS

| | | |
|---|---|---|
| WO | WO 03/088699 A1 | 10/2003 |
| WO | WO 2005/050478 A1 | 6/2005 |

OTHER PUBLICATIONS

Korean Office Action for Transmission No. 9-5-2010-006550777, dated Feb. 16, 2010, 11 pgs., English translation attached.

First Office Action for Application No. 200680012257.2, dated Feb. 12, 2010, 12 pgs., English translation attached.

* cited by examiner

METHOD FOR MANAGING A TERMINAL DEVICE

CROSS-REFERENCES TO RELATED APPLICATIONS

The present application is a continuation of PCT Application No. PCT/CN2006/001869, filed Jul. 27, 2006, which claims priorities to Chinese Patent Application No. 200510112683.0, filed Oct. 13, 2005 and Chinese Patent Application No. 200510135008.X, filed Dec. 23, 2005. All of these applications are incorporated by reference herein for all purposes.

BACKGROUND OF THE INVENTION

The present invention relates to Open Mobile Alliance (OMA) Device Management (DM), and more particularly to a method for managing a terminal device.

Mobile terminal devices act as an important component in the whole mobile operation and service system. As functions of terminal devices become increasingly complex, the probability of software troubles in terminal devices increases greatly. In addition, as the competition among operators becomes more and more severe, how to effectively ensure customers' experience, enhance their loyalty, and maintain high QoS and low equipment maintenance cost has become a great concern for operators and terminal manufacturers.

Open Mobile Alliance Device Management (OMA DM) Specification is the technique for management, diagnostics, and maintenance of mobile terminal devices. The terminal devices are managed in an Over The Air (OTA) manner. Management operations of terminal devices include: terminal device parameter setting, firmware update, software installation and upgrade, and acquisition and handling of device fault and event information, etc. Also, OMA DM also provides a Web Services Interface (WSI) mechanism, which enables third-party software/service providers to provide customers with a variety of services through a Device Management (DM) Server, such as software download and update, firmware upgrade, parameter configuration, and device diagnostics, etc. The mobile terminal devices that may be managed by the OMA DM include mobile telephones, personal digital assistants, laptop computers, embedded devices, and onboard systems, and any other mobile terminal devices.

As communication technology develops, functions of terminal devices become more and more powerful. For example, at present, some terminal devices have a high-resolution camera, a high storage capacity, an infrared transmission interface, and a Blue Tooth transmission interface, etc. For some enterprises or organizations sensitive to technology, the application of such terminal devices makes information security more and more uncontrollable. For example, new designs are stolen by photographing stealthy, or confidential technical materials are stolen with mobile telephones by infrared transmission, etc.

SUMMARY OF THE INVENTION

Some embodiments of the present invention provide a method for managing a terminal device, to control terminal devices, so as to prevent security information in an enterprise from attacks of the terminal devices and thereby enhance security and confidentiality of enterprise information.

Some embodiments of the present invention provide a method for managing a terminal device including:

setting management commands;

sending the management commands to a terminal device; and obtaining executed results of the management commands from the terminal device.

Preferably, the method further includes:

setting triggering conditions; and executing the management commands if the triggering conditions are met.

Preferably, the method further includes: sending the triggering conditions to the terminal device.

Preferably, the management commands and the triggering conditions are sent to the terminal device in a form of device management tree.

Preferably, the method further includes:

monitoring that the triggering conditions are met; and sending an execution instruction to the terminal device;

wherein the process of executing the management commands comprises: executing the management commands in response to the execution instruction.

Preferably, the process of obtaining executed results of the management commands from the terminal device is implemented in the following mode:

the terminal device reports the executed results of the management commands to a Device Management Server (DMS); or a Device Management Server (DMS) retrieves the executed results of the management commands from the terminal device.

Preferably, the process of sending the management commands to a terminal device comprises:

authenticating the management commands, determining the management commands meet a device management protocol upon a successful authentication, and sending the management commands to the terminal device; or authenticating the management commands, determining the management commands do not meet a device management protocol upon a successful authentication, translating the management commands into commands meeting a device management protocol, and sending the translated management commands to the terminal device.

Preferably, the management commands comprise:

to record use of additional functions of the terminal device; or to disable/enable additional functions of the terminal device.

Preferably, the additional functions of the terminal device comprise at least one of:

camera function of the terminal device with a camera;

short-range wireless communication function of the terminal device with an infrared interface, and short-range wireless communication function of the terminal device with a Blue Tooth interface.

Preferably, the triggering conditions include:

a time-based triggering condition, for triggering execution of the management commands by time; and/or a location-based triggering condition, for triggering execution of the management commands by current location of the terminal device.

Some other embodiments of the present invention provide a method for managing a terminal device, including:

setting management commands;

configuring a terminal device with the management commands; and obtaining executed results of the management commands from the terminal device.

Preferably, the process of configuring a terminal device with the management commands is implemented by writing the management commands into a smart card installed in the terminal device.

Preferably, the process of writing the management commands into a smart card configured in the terminal device comprises: writing the management commands into the smart card installed in the terminal device in a form of device management tree.

Preferably, the method further includes:

setting triggering conditions; and executing the management commands if the triggering conditions are met.

Preferably, the method further includes: writing the triggering conditions into a smart card installed in the terminal device.

Preferably, the process of writing the triggering conditions into a smart card installed in the terminal device comprises: writing the triggering conditions into the smart card installed in the terminal device in a device management tree.

Preferably, the process of obtaining executed results of the management commands from the terminal device is implemented in the following mode:

the terminal device reports the executed results of the management commands to a Device Management Server (DMS); or a Device Management Server (DMS) retrieves the executed results of the management commands from the terminal device.

Preferably, the method further includes: updating and maintaining the management commands configured in the terminal device.

Preferably, the management commands include:

to record use of additional functions of the terminal device; or to disable/enable additional functions of the terminal device.

Preferably, the additional functions of the terminal device comprise at least one of:

camera function of the terminal device with a camera;

short-range wireless communication function of the terminal device with an infrared interface, and short-range wireless communication function of the terminal device with a Blue Tooth interface.

Preferably, the triggering conditions include:

a time-based triggering condition, for triggering execution of the management commands by time; and/or a location-based triggering condition, for triggering execution of the management commands by current location of the terminal device.

According to the embodiments of the present invention:

Management commands are set at a management side. The management commands are sent to managed terminal devices through a DMS or the managed terminal devices are configured with the management commands. The managed terminal devices execute the management commands, so that the management side can manage the terminal devices. Further, the managed terminal devices may report executed results of the management commands to the management side through the DMS, so that an administrator can monitor states of the managed terminal devices, so as to control the terminal devices.

If the technical solution according to embodiments of the present invention is used in an enterprise to manage the use of user terminal devices in the enterprise by a management side of the enterprise. Therefore, threats of communication terminal devices of employees to security information can be avoided effectively, and the security of enterprise information can be enhanced.

DETAILED DESCRIPTION OF THE INVENTION

Based on the OMA DM Specification, embodiments of the present invention provide a mechanism by utilizing terminal device management capability and Web Service Interface (such as WSI) of Device Management Server (DMS), to enable enterprises or organizations to manage use of terminal devices of their employees, so as to ensure security of enterprise information within a controllable range.

Hereinafter embodiments of the present invention are described in detail with reference to the attached drawings.

Figure 1:
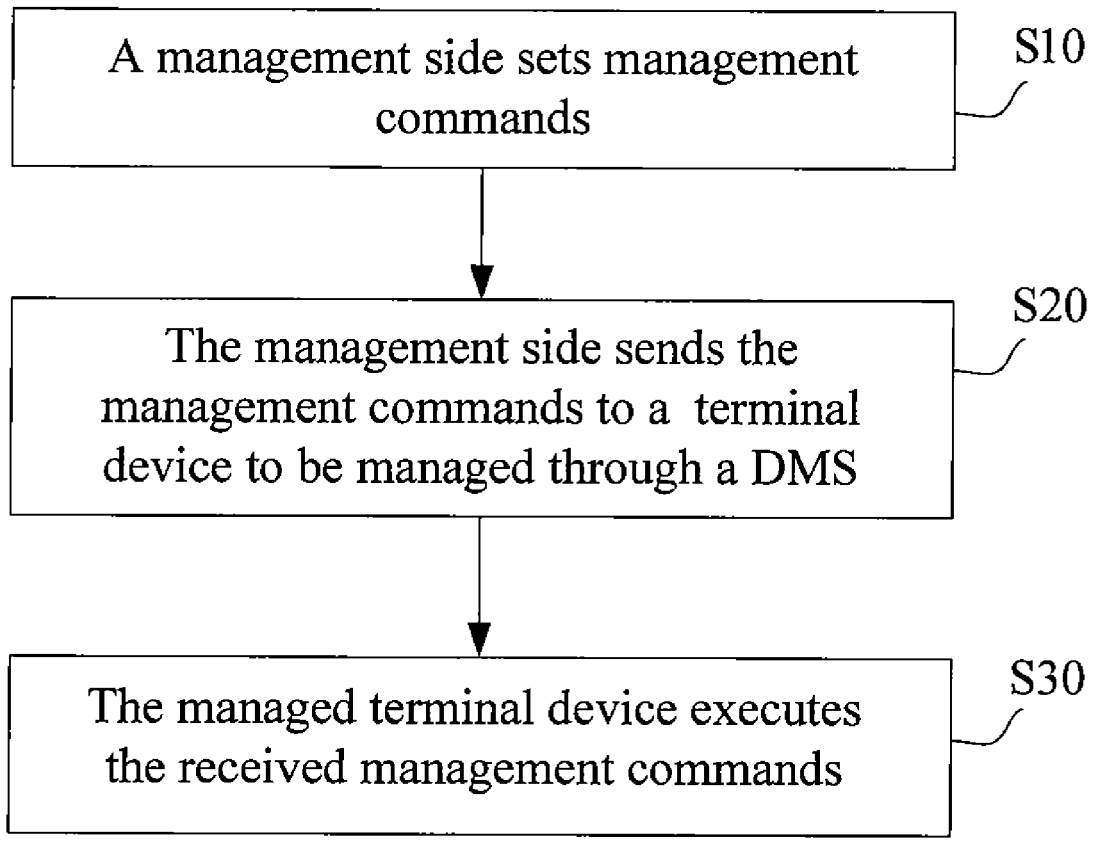
FIG. 1 is a flow diagram of a method for managing a terminal device according to a first embodiment of the present invention.

FIG. 1 is a flow diagram of a method for managing a terminal device according to a first embodiment of the present invention.

In process S10, a management side sets management commands. The management commands may be configured to record use of additional communication functions of a terminal device to be managed or disable/enable additional communication functions of a terminal device to be managed, etc.

In consideration of current development of terminal devices, the additional communication functions of terminal device mainly include, but not limited to: camera function of the terminal device with a camera, and/or short-range wireless communication function of the terminal device with an infrared interface, and/or short-range wireless communication function of the terminal device with a Blue Tooth interface.

In process S20, the management side sends the management commands to the terminal device to be managed via the DMS. The management side may communicate with the DMS via an external interface (such as WSI interface) of the DMS, i.e., the management side sends the management commands to the DMS and sends information of the terminal device to be managed to the DMS. The DMS sends the management commands to the terminal device in accordance with the information of the terminal device to be managed by the management side.

The DMS authenticates the management commands, and determines whether the management commands meet DM protocol after a successful authentication. If yes, the DMS sends the management commands to the managed terminal device; otherwise the DMS translates the management commands into DM commands meeting the DM protocol, and sends translated management commands to the managed terminal device.

In process S30, the managed terminal device executes the management commands.

When the method according to an embodiment of the present invention is applied, the management commands need to be triggered and executed when appropriate in some cases, instead of always executed; for example, in the case that an enterprise manages and controls the use of terminal devices of employees in the enterprise, it is only necessary to manage the terminal devices of the employees during worktime or when the employees are in offices, instead of in other time or at other places.

In view of the above situation, the management side shall set triggering conditions for triggering execution of the management commands. Accordingly, the method according to an embodiment of the present invention may be implemented in any of the following three examples:

Example 1

A management side sets management commands and triggering conditions for triggering execution of the management commands respectively;

The management side monitors whether the triggering conditions are met;

If monitoring that the triggering conditions are met, the management side sends the management commands to a managed terminal device via the DMS;

Upon receiving the management commands, the managed terminal device executes the management commands immediately.

Example 2

A management side sets management commands and triggering conditions for triggering execution of the management commands respectively;

The management side sends the management commands and the triggering conditions for triggering execution of the management commands to a managed terminal device via the DMS;

The managed terminal device stores the management commands and the triggering conditions for triggering execution of the management commands from the DMS. The managed terminal device preferably utilizes a device management tree (DM tree) to store the management commands and the triggering conditions for triggering execution of the management commands (i.e., the management commands and the triggering conditions are stored in an OMA DM tree in the managed terminal device); in this way, nodes of the DM tree of triggering conditions can be identified and manipulated by an OMA DM Scheduling enabler, and the managed terminal device selects a specific sub-tree or node of management commands in the DM tree to execute the management commands when the triggering conditions are met.

The managed terminal device monitors whether the received triggering conditions are met; and If the triggering conditions are met, the managed terminal device executes the management commands immediately.

Example 3

A management side sets management commands and triggering conditions for triggering execution of the management commands respectively;

The management side sends the management commands to a managed terminal device via the DMS;

The managed terminal device stores the management commands from the management side; and the managed terminal device preferably utilizes a DM tree to store the management commands;

The management side monitors whether the triggering conditions are met;

If the triggering conditions are met, the management side sends an execution instruction to the managed terminal device via the DMS;

Upon receiving the execution instruction, the managed terminal device executes the management commands stored locally (i.e., upon receiving the execution instruction, the managed terminal device selects a specific sub-tree or node of management commands in the DM tree to execute).

The triggering conditions for triggering execution of the management commands set by the management side may include, but not limited to:

A time-based triggering condition configured to trigger execution of the management commands by time, i.e., the management commands shall be executed within a specified time period but may not be executed within other time periods;

A location-based triggering condition configured to trigger execution of the management commands by current location of the managed terminal device, i.e., the management commands shall be executed if the managed terminal device is in a specified location but not executed if the managed terminal device is not in the specified location. Current location of the managed terminal device may be detected with a location function.

To facilitate the management side to obtain the information on use of the managed terminal device, the managed terminal device shall feed back executed results of the management commands to the management side. The managed terminal device may feed back the executed results to the management side in any of the following four examples:

Example 1: the managed terminal device reports the executed results of the management commands to the DMS periodically; the DMS reports the executed results to the management side in turn.

Example 2: the managed terminal device reports the executed results of the management commands to the DMS periodically; the management side retrieves the executed results from the DMS periodically.

Example 3: the DMS retrieves the executed results of management commands from the managed terminal device periodically, and reports the executed results to the management side periodically in turn.

Example 4: the DMS retrieves the executed results of management commands from the managed terminal device periodically; the management side retrieves the executed results from the DMS periodically.

The terminal devices under a management of the management side may be updated at any time (e.g., new terminal devices are added, some existing managed terminal devices are removed, etc.). When information of any managed terminal device changes, the management side shall update the information of the managed terminal device in a local database in synchronization, so as to improve pertinency and accuracy of the management.

Figure 2:
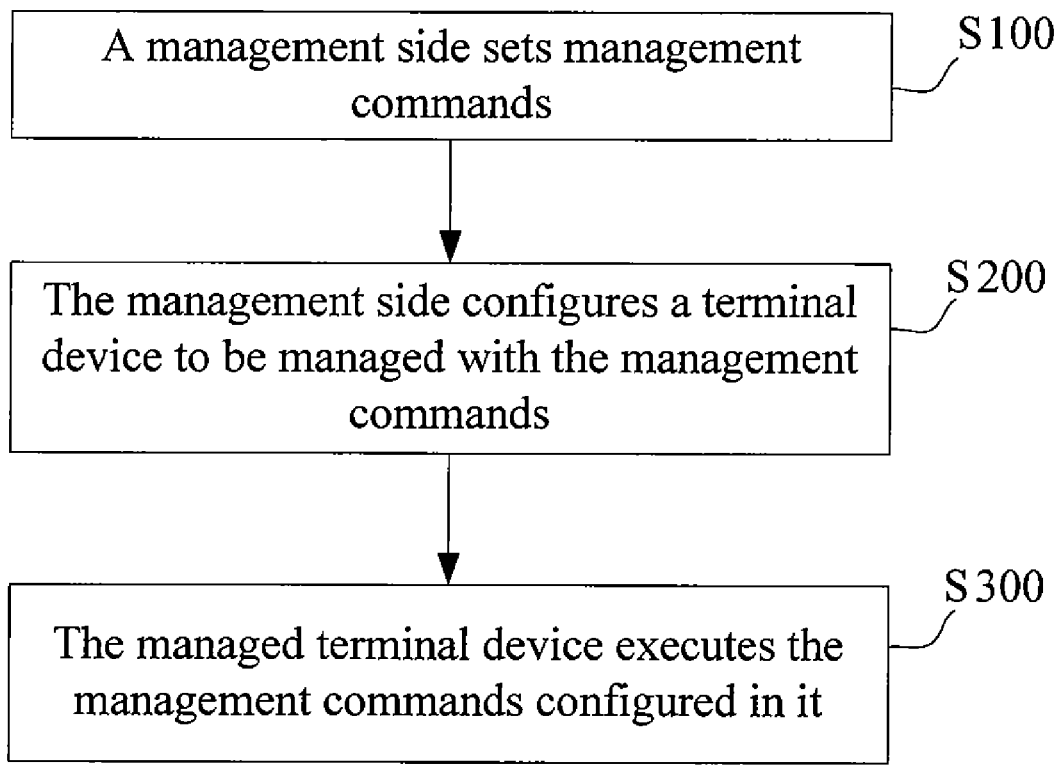
FIG. 2 is a flow diagram of a method for managing a terminal device according to a second embodiment of the present invention.

FIG. 2 is a flow diagram of a method for managing a terminal device according to a second embodiment of the present invention. The major implementation procedures are described as follows.

In process S100, a management side sets management commands. The management commands have the same meaning as described above, and therefore will not be described further here.

In process S200, the management side configures a terminal device to be managed with the management commands. The management side can configure the managed terminal device with the management commands by writing the management commands into a smart card installed in and identified by the managed terminal device. The management side preferably utilizes a DM tree to write the management commands into the smart card installed in and identified by the managed terminal device. Also, the management side can subsequently maintain and update the management commands configured in the managed terminal device through the DMS.

In process S300, the managed terminal device executes the management commands configured therein, i.e., the managed terminal device can select a specific sub-tree or node of management commands in the DM tree stored in the local smart card to execute.

Similarly, based on the above technical solution, the management side may set triggering conditions for triggering execution of the management commands. Accordingly, the method according to an embodiment of the present invention can be implemented in either of the following two examples:

Example 1

A management side sets management commands and triggering conditions for triggering execution of the management commands.

The management side configures a terminal device to be managed with the management commands and the triggering conditions for triggering execution of the management commands respectively. The management side can configure the managed terminal device with the management commands and the triggering conditions respectively by writing the management commands and the triggering conditions into a smart card installed in and identified by the managed terminal device respectively. The management side preferably utilizes a DM tree to write the management commands and the triggering conditions into the smart card installed in and identified by the managed terminal device respectively.

The managed terminal device monitors whether the triggering conditions configured therein are met. If the triggering conditions are met, the managed terminal device executes the management commands configured therein immediately, i.e., nodes of the DM tree of triggering conditions can be identified and manipulated by an OMA DM Scheduling enabler. The managed terminal device selects a specific sub-tree or node of management commands in the DM tree stored in the local smart card to execute, when it detects the triggering conditions are met.

Example 2

A management side sets management commands and triggering conditions for triggering execution of the management commands.

The management side configures a managed terminal device with the management commands via a smart card, i.e., the management side utilizes a DM tree to write the management commands into the smart card installed in and identified by the managed terminal device.

The management side monitors whether the triggering conditions are met; and

If the triggering conditions are met, the management side sends an execution instruction to the managed terminal device through the DMS.

Upon receiving the execution instruction, the managed terminal device executes the management commands configured therein, i.e., upon receiving the execution instruction, the managed terminal device selects a specific sub-tree or node of management commands in the DM tree stored in the local smart card to execute.

The triggering conditions are described as above, which will not be described here further.

Similarly, to facilitate the management side to obtain the information on use of the managed terminal device, the managed terminal device shall feed back executed results of the management commands to the management side. The managed terminal device may feed back the executed results to the management side in any of the above four examples. The specific implementation procedures will not be described further.

Hereinafter the implementing procedures of two methods for managing terminal devices according to embodiments of the present invention are described in an example of managing the use of terminal devices in an enterprise.

Figure 3:
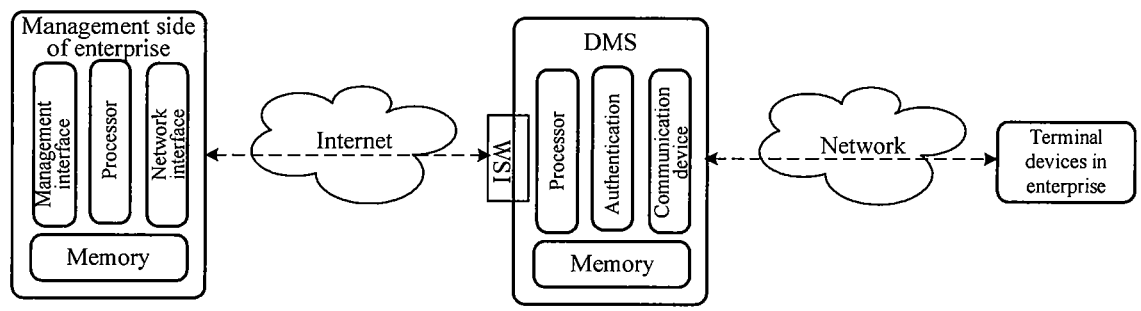
FIG. 3 is a structural diagram of an exemplary system for management and control of user terminal devices in an enterprise, which is implemented with the method according to an embodiment of the present invention.

FIG. 3 is a structural diagram of an exemplary system for management and control of terminal devices in an enterprise, which is implemented with the method according to an embodiment of the present invention. A WSI interface shown in FIG. 3 is an interface provided by the DMS to connect an external system. The external system may be a secondary DM Server, a Service Provider (SP) server, a customer service support system, a diagnostics support system, or a Portal, etc. In this embodiment, a management server in the enterprise can be connected to the operator's DMS via the WSI interface. A network between the DMS and the terminal devices in the enterprise may be, but not limited to, a mobile communication network.

As shown in FIG. 3, the major working procedures of the embodiment are as follows: an administrator of the enterprise submits the management commands, the triggering conditions for triggering execution of the management commands, and information of a target user group to be managed to the DMS at the communication network operator (hereinafter referred to as "operator") side through the management server in the enterprise. The DMS at the operator side authenticates the management server in the enterprise, and after a successful authentication sends the management commands and the triggering conditions for triggering execution of the management commands to each terminal device in the enterprise in accordance with IDs of users in the target user group. When the triggering conditions are met, each terminal device in the enterprise is triggered, executes the management commands, and reports the executed results of the management commands to the management server in the enterprise through the DMS in accordance with a predetermined report policy.

Figure 4:
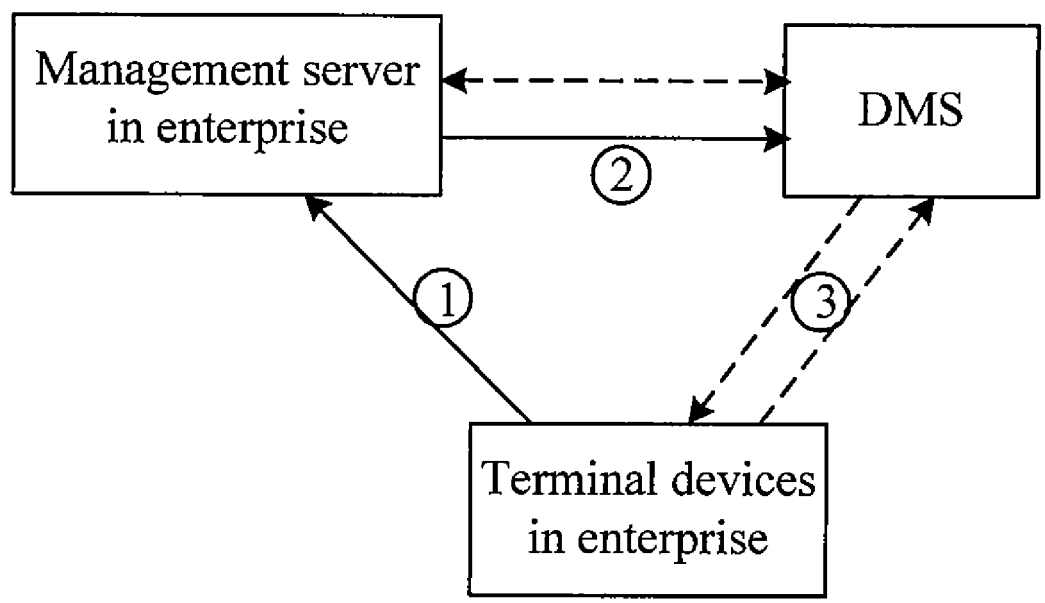
FIG. 4 is a flow diagram of registration of users in an enterprise on the management server in the enterprise so as to determine target operation group user information according to an embodiment of the present invention, based on the system as shown in FIG. 3.

FIG. 4 is a flow diagram of registration of users in an enterprise on the management server in the enterprise so as to determine information of target operation group users according to an embodiment of the present invention, based on the system as shown in FIG. 3. For example, when the enterprise expects to control some functions of terminal devices of the employees during work time, the enterprise shall register itself with the DMS at the operator side first, and request the employees to register with the management server in the enterprise.

As shown in FIG. 4, (1) the administrator in the enterprise maintains the management server in the enterprise, and the employees in the enterprise register themselves with the management server. The content of registration mainly includes user ID, password, user name, and user terminal number, etc. The registration process may involve bidirectional identity authentication procedures; (2) before the management server in the enterprise registers with the DMS at the operator side, bidirectional authentication process may be performed. After a successful authentication, the management server registers with the DMS at the operator side. The content of registration includes user name, password, target operation group, and management authority level, etc.; (3) after the DMS at the operator side accepting the registration of the management server in the enterprise, the DMS at the operator side notifies users in the enterprise to confirm the registration, in order to obtain the permission for management of the target operation group users. The confirmation procedure may be accomplished by short message, telephone, or any other means.

Figure 5:
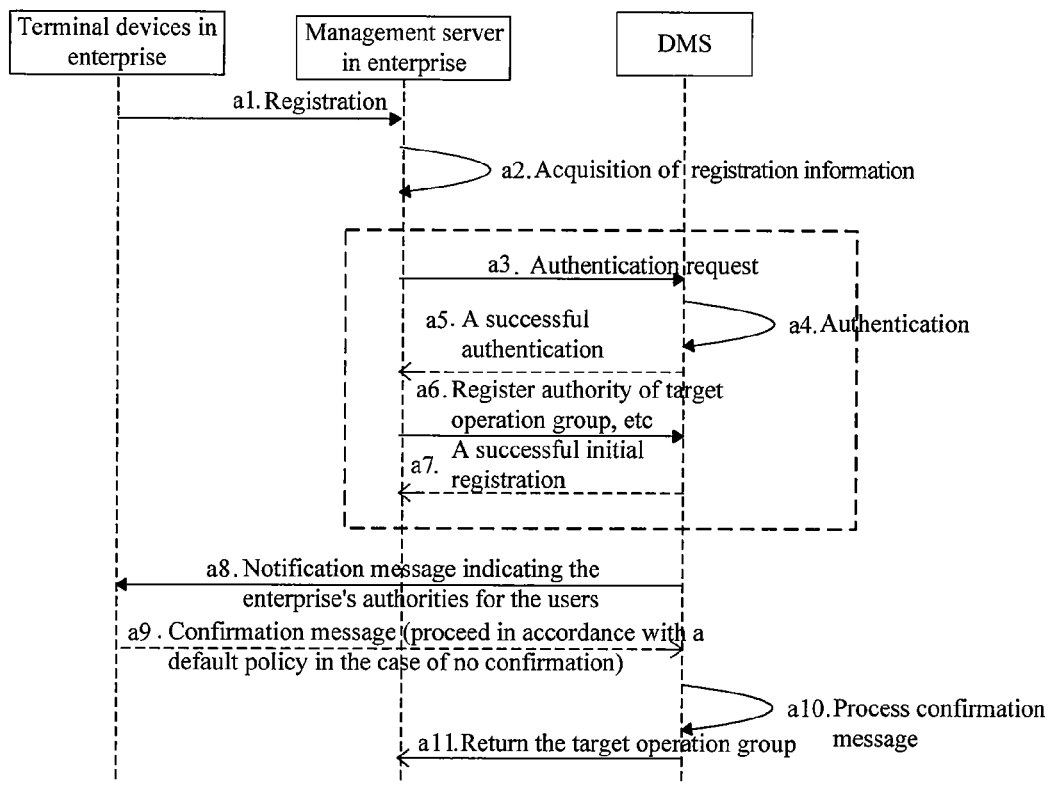
FIG. 5 is a detailed flow diagram of registration of users in an enterprise on the management server in the enterprise so as to determine target operation group user information according to an embodiment of the present invention, based on FIG. 4.

FIG. 5 is a detailed flow diagram of registration of users in an enterprise on the management server in the enterprise so as to determine target operation group user information according to an embodiment of the present invention, based on FIG. 4. The specific registration procedures are as follows.

a1. The employees in the enterprise register themselves with the administrator of the enterprise (or the terminal devices in the enterprise register themselves with the management server in the enterprise via network). The content of registration mainly includes user ID, password, user name, and user terminal number, etc.

a2. The administrator of the enterprise (or the management server in the enterprise) acquires the registration information of the employees.

a3. The management server in the enterprise sends an identity authentication request to the DMS at the operator side.

a4. The DMS at the operator side performs identity authentication on the enterprise.

a5. After a successful identity authentication, the DMS returns an authentication success message to the management server in the enterprise.

a6. The management server in the enterprise sends a target operation group and operation authorities register request to the DMS.

a7. The DMS returns an initial registration success message (i.e., the registration has not been confirmed by target operation group users) to the management server in the enterprise.

a8. The DMS sends a notification message indicating the enterprise's operation authorities for the terminal devices to the terminal devices in the enterprise, in accordance with information of the target operation group users, and waits for the terminal devices in the enterprise to confirm.

a9. Each of the terminal devices in the enterprise returns a confirmation message to confirm the registration. The DMS processes the confirmation message. If the terminal device in the enterprise returns a rejection message, the DMS will delete the user information from the target operation group users.

a10. The DMS feeds back the information of the target operation group users to the management server in the enterprise.

The administrator of the enterprise maintains information of the target operation group users in the management server in the enterprise, so that the management server in the enterprise can maintain and update the information of the target operation group users in the DMS via the WSI interface or by logging in Portal of the DMS, or by other means, whenever the information of the target operation group users changes.

Figure 6:
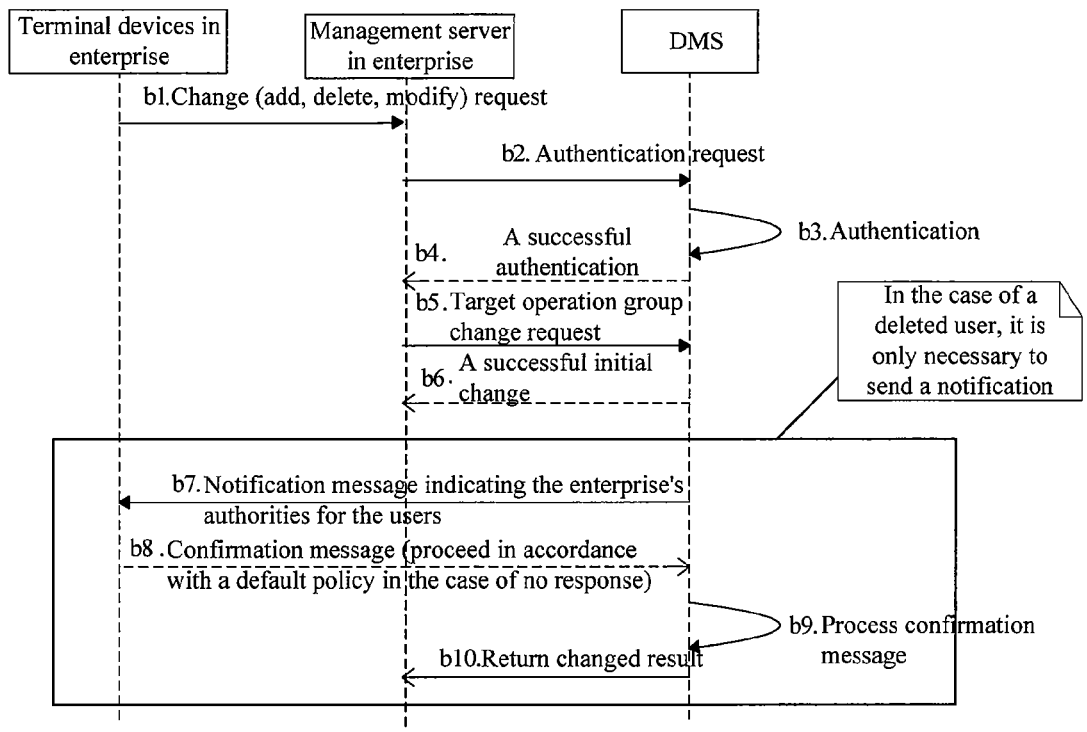
FIG. 6 is a detailed flow diagram of maintenance of target operation group user information according to an embodiment of the present invention.

FIG. 6 is a detailed flow diagram of maintenance of target operation group user information according to an embodiment of the present invention. The specific maintenance procedures are as follows.

b1. A user in an enterprise submits a change request message to an administrator of the enterprise (or a terminal device submits a change request message to a management server in an enterprise via intranet). The change may be: to add a new target operation user, to delete an existing target operation user, or to modify information of an existing target operation user, etc.

b2. The management server in the enterprise sends an identity authentication request to a DMS at an operator side.

b3. The DMS performs identity authentication on the enterprise.

b4. After a successful identity authentication, the DMS returns an authentication success message to the management server in the enterprise.

b5. The management server in the enterprise sends a target operation group change request to the DMS.

b6. The DMS returns an initial change success message.

b7. The DMS sends a notification message indicating the enterprise's operation authority to the newly-added target operation terminal device, and waits for the newly-added target operation user to confirm.

b8. The newly-added target operation terminal device, returns a confirmation message.

b9. The DMS processes the confirmation message. If the newly-added target operation user returns a reject message, the DMS will not add the newly-added target operation user into the target operation group.

b10. The DMS feeds back information of the target operation group users to the management server in the enterprise.

If the newly-added target operation terminal device in the enterprise does not send any response, the DMS will proceed in accordance with a default policy.

For an operation for deleting a target operation user, the DMS sends the notification message to the deleted target operation user in the above process b7, while the subsequent processes b8, b9 and b10 are not performed.

In addition, the DMS shall send a confirm message to the newly-added target operation user terminal device, or sends a notification message to the target operation user terminal device deleted by the enterprise.

The management of terminal devices in the enterprise includes, but not limited to: recording the use of additional functions of terminal devices and reporting the recorded results to the enterprise, or controlling use of some additional functions of the terminal devices in the enterprise (e.g., preventing the users from using the camera of their terminal devices to take photographs or communicating by using the infrared interface or Blue Tooth interface communicate during work time, etc), or performing parameter setting on the terminal devices in the enterprise, etc.

Hereinafter the specific implementing procedures of the two methods according to embodiments of the present invention in an application of management and control of terminal devices in an enterprise are described.

Method 1: management and control is accomplished by sending management commands through the DMS:

With the terminal management capability and an external WSI interface of the DMS, the management server in the enterprise accesses the DMS, so as to send management commands to the terminal devices to be managed in the enterprise through the DMS and thereby implement management and control of the terminal devices. The management commands may be: to record the use of additional functions, to disable/enable some additional functions, to query about current states of the terminal devices, or to set some parameters (e.g., tone), etc.

In addition, the enterprise may install and configure some management function software in the terminal devices in the enterprise through the DMS at the operator side, to implement management and control of the terminal devices. The management function software (e.g., logging software or function control software, etc.) can run in the user terminal devices in the enterprise, to control and manage the use of the terminal devices.

The enterprise has to apply to the DMS for authority for content and means of management of the user terminal devices in the enterprise. The DMS requests the managed terminal devices to confirm the authority. In addition, during the entire process of sending the management commands or installing and configuring the management function software, the DMS performs identity authentication on the enterprise.

Figure 7:
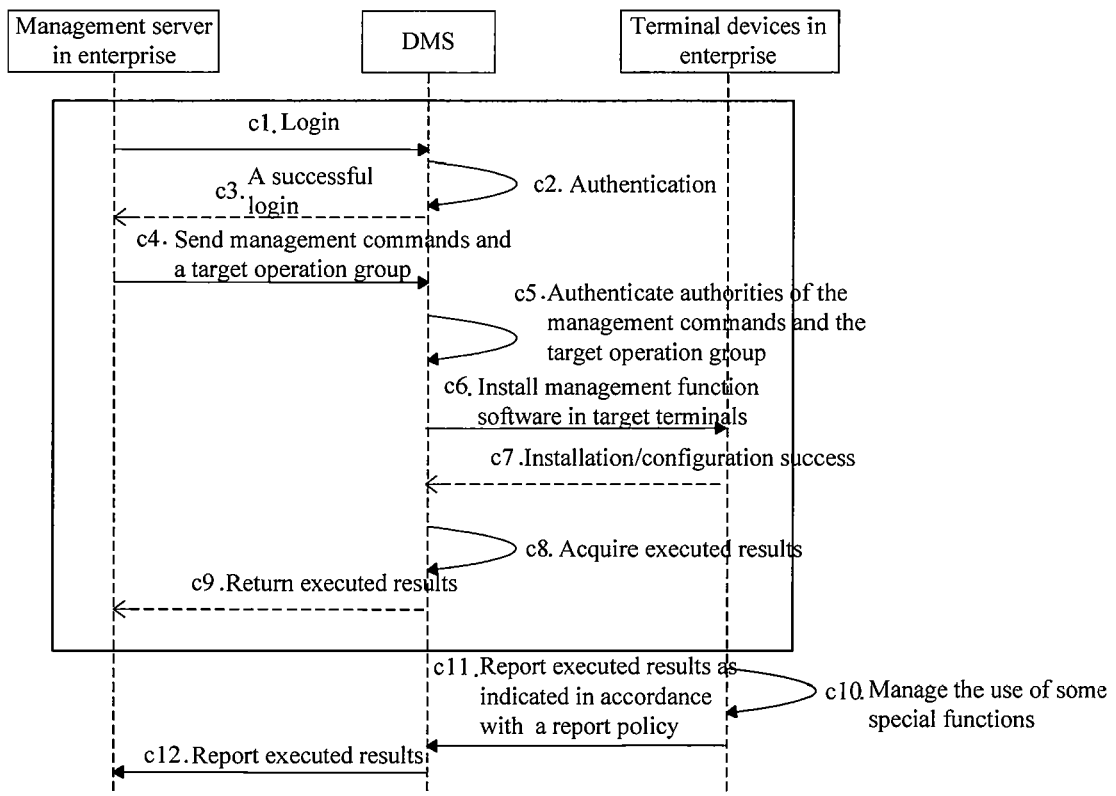
FIG. 7 is a flow diagram in which an enterprise manages use of user terminal devices in an enterprise with the method according to the first embodiment of the present invention.

FIG. 7 is a flow diagram in which an enterprise manages use of user terminal devices in an enterprise with the method according to the first embodiment of the present invention. The specific processing procedures are as follows.

c1. An enterprise logs in a DMS at the operator side through a management server.

c2. The DMS at the operator side performs identity authentication on the enterprise.

c3. After a successful identity authentication, the DMS returns a login success message to the management server.

c4. The management server in the enterprise submits management commands and information of target operation group users to the DMS at the operator side.

c5. The DMS at the operator side authenticates authorities of the management commands and the target operation group from the enterprise.

c6. The DMS at the operator side sends the management commands to or installs management function software in the target user terminal devices corresponding to the information of target operation group users.

c7. Each of the user terminal devices returns an installation/configuration success message to the DMS if the management function software is installed/configured successfully;

c8. The DMS at the operator side acquires executed results of the management commands from the user terminal devices.

c9. The DMS at the operator side returns the executed results to the management server in the enterprise.

c10. The management function software in the user terminal devices launches the management function to manage additional functions of the terminal devices if the triggering conditions are met.

c11. If a reported condition is met, each of the user terminal devices reports executed result data of the management to the DMS.

c12. The DMS at the operator side reports the executed result data to the management server in the enterprise.

The above executed result data may be retrieved by the DMS actively from the terminal devices or reported by the terminal devices to the DMS actively, and is managed by the DMS centrally. The executed result data acquired by the DMS may be transferred to the management server in the enterprise by the DMS in accordance with a certain policy (e.g., at a certain time interval), or retrieved by the management server in the enterprise from the DMS via the WSI interface.

Method 2: management and control is accomplished by means of smart card and DMS.

The enterprise customizes a type of identifiable smart cards for terminal devices in the enterprise, and writes the management function software (e.g., logging software or function control software, etc.), enterprise identity authentication information, and triggering condition for triggering execution of the management function software into the smart cards, respectively. The enterprise may write each management function software and the triggering condition corresponding to the management function software into the smart cards in a form of DM tree, and distributes the smart cards to the employees in the enterprise.

Furthermore, the management server in the enterprise may perform maintenance and data update on the smart cards installed in the user terminal devices in the enterprise through the DMS at the operator side. The DMS will perform identity authentication on the enterprise by using the authentication information stored in the smart cards before the enterprise maintains the smart cards installed in the terminal devices of the employees through the DMS. The update and maintenance of the smart cards installed in the user terminal devices mainly includes update of the management function software, download of new management function software, removal of old management function software, and sending of new triggering conditions, etc.

When the smart card is inserted into a user terminal device in the enterprise, a DM agent in the terminal device will identify and execute the management commands written in the smart card. The management commands in the smart card may be management commands existing originally in the card or management commands sent from the enterprise through the DMS. For example, if the triggering condition is met (e.g., it is during work time from 08:00 to 18:00) after the logging software is installed or runs in a terminal device, the recording function corresponding to the above time under the corresponding sub-tree or node of the DM tree in the smart card will be triggered and executed automatically to record the use of the terminal device in the enterprise. If the terminal device determines that the reported condition is met (e.g., when illegal use of a camera is found), it will report to the management server in the enterprise through the DMS at the operator side automatically.

The executed result data of the management commands executed in the user terminal devices in the enterprise may be retrieved by the DMS actively or reported by the terminal devices to the DMS actively, and is managed by the DMS centrally. The executed result data acquired by the DMS may be transferred to the management server in the enterprise by the DMS in accordance with a certain policy (e.g., at a certain time interval), or retrieved by the management server in the enterprise from the DMS via the WSI interface.

Figure 8:
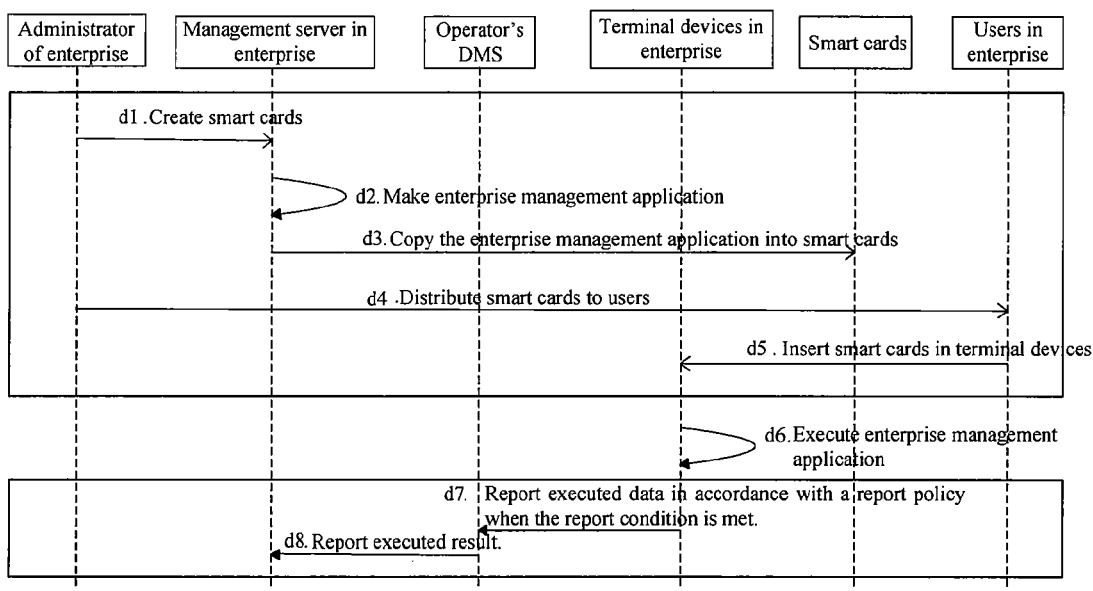
FIG. 8 is a flow diagram in which an enterprise manages use of user terminal devices in an enterprise with the method according to the second embodiment of the present invention.

FIG. 8 is a flow diagram in which an enterprise manages use of user terminal devices in an enterprise with the method according to the second embodiment of the present invention. The specific processing procedures are as follows.

d1. An administrator of an enterprise manipulates a management server in the enterprise to create smart cards for the enterprise.

d2. The management server in the enterprise makes enterprise management application.

d3. The management server in the enterprise copies the enterprise management application into the smart cards.

d4. The administrator of the enterprise distributes the smart cards to users in the enterprise.

d5. The users in the enterprise insert the smart cards into their terminal devices.

d6. The user terminal devices in the enterprise execute the enterprise management application in the smart cards automatically in accordance with triggering conditions.

d7. If a report condition is met, the user terminal devices in the enterprise report executed result data to the DMS at the operator side in accordance with a preset report policy automatically.

d8. The DMS at the operator side reports the executed result data to the management server in the enterprise.

Figure 9:
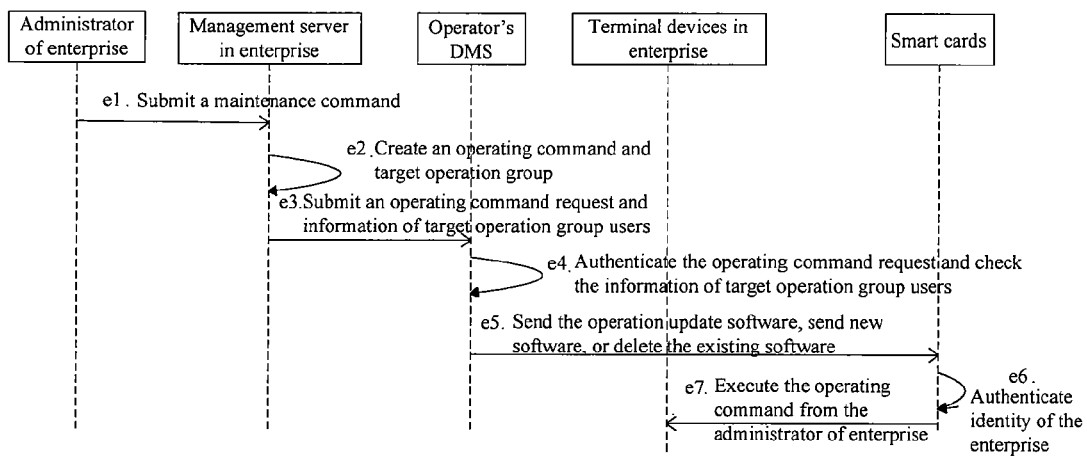
FIG. 9 is a flow diagram in which an enterprise maintains and updates management information in smart cards installed in user terminal devices according to an embodiment of the present invention.

FIG. 9 is a flow diagram in which an enterprise maintains and updates management information in smart cards installed in user terminal devices according to an embodiment of the present invention. The specific processing procedures are as follows.

e1. An administrator of an enterprise submits a maintenance command to a management server in the enterprise. The maintenance command may be: delete an existing enterprise management application, update the existing enterprise management application, send other enterprise management commands to smart cards, or update triggering conditions in smart cards, etc.

e2. The management server in the enterprise creates an operating command and information of target operation group in accordance with the maintenance command submitted by the administrator of an enterprise.

e3. The management server in the enterprise submits an operating command request and information of target operation group users to the DMS at the operator side.

e4. The DMS at the operator side authenticates the operating command request and checks the information of target operation group users submitted from the management server in the enterprise.

e5. The DMS sends the operating command to the smart cards installed in the user terminal devices to update the enterprise management application in the smart cards correspondingly, in accordance with the information of target operation group users.

e6. The terminal devices perform identity authentication on the enterprise in accordance with the authentication information stored in the smart cards.

e7. The DM agents in the user terminal devices trigger the operating command sent from the enterprise to update the enterprise management application in the smart cards.

In Method 1 and Method 2 according to the embodiments, the implementations of the interface provided by the DMS include, but not limited to: a message interface (TCP/IP message interface, HTTP message interface, XML message interface, or network protocol message interface, etc.), a file interface, and an API interface (the API can be invoked remotely by means of CORBA, Web Service (SOAP), RMI/IIOP, or DCOM, etc., besides local invocation).

The management commands are executed under certain triggering conditions. The management of the terminal devices is incomplete. The incompleteness means: the management and control is limited by the prior condition instead of having complete control right unconditionally. For example, the control of camera function on mobile telephones of the employees in an enterprise may be valid only during work time but invalid in other times.

The triggering conditions for triggering execution of management commands include, but not limited to: a location-based triggering condition and a time-based triggering condition. The location-based triggering condition can be implemented with the location function; for example, a suppression of camera function of the terminal devices shall be triggered only during work time. In this case, there are two triggering conditions: a time-based triggering condition (work time) and a location-based triggering condition (office area).

The triggering condition can be configured to the management function software installed in the terminal devices or sent as an element in a management tree to the terminal devices through the DMS. When the triggering conditions are met, the terminal device can request for management commands to the management server in the enterprise or launch a management function corresponding to the management commands automatically and report current state of the terminal device to the management server in the enterprise.

When expecting to change the triggering conditions, the enterprise may update the existing triggering conditions configured in the terminal devices or resend trigger conditions as an element in a management tree through the DMS.

Hereinafter a detailed example is described:

An enterprise (a group) wants to suppress the camera function of mobile telephones of its employees (terminal users) only during work time, in order to prevent leakage of information of new products.

For this, the enterprise informs all employees to register with the management server in the enterprise through a Portal of the enterprise with the following registration command:

RegisterUser (id, name, passwd, phone_number, phone_type).

After the registration, the enterprise registers with the DMS at the operator side to request for management authorities for the terminal devices with the following request command:

ApplyService (op_type, tagetset[ ], op_right).

To protect lawful rights and interests of the terminal devices in the enterprise, the DMS at the operator side sends a short message to each of the mobile telephone users to describe the case and request the user to confirm by returning a short message (e.g., "88" indicates acceptance, while "00" indicates rejection). If a user doesn't respond to the short message within a specified period, it is deemed that the user accepts by default. The DMS at the operator side acquires information of the mobile telephone users accepting or rejecting management respectively, corrects the information of target operation group users registered by the enterprise on the basis of the acquired information, and returns the information fed back from the users to the management server in the enterprise.

The enterprise makes a smart card for each of the employees, creates an enterprise management application covering camera function logging software, enterprise identity authentication information, and triggering condition for triggering execution of the logging software, and writes the enterprise management application into the smart cards in a form of a DM tree.

The employees insert the smart cards into their mobile telephones and power on the mobile telephones. The DM agents in the mobile telephones will identify the smart cards automatically and launch the enterprise management application in the smart cards.

Once camera function logging software in smart card of an employee's mobile telephone detects the employee is using the camera function illegally in accordance with the triggering condition, it will report the recorded result to the DMS at the operator side automatically with the following report command:

```
<Alert>
    <CmdID>2</CmdID>
    <Data>1226</Data> <-- Generic Alert -->
    <Item>
        <Source><LocURI>./Root/ViolationInfo</LocURI></Source>
        <Meta>
            <Type>org.openmobilealliance.dm.violationinfo.userrequest</Type>
            <Format>chr</Format>
        </Meta>
        <Data>
        <CDATA>...</CDATA> <-- Upload data -->
        </Data>
    </Item>
</Alert>
```

The DMS at the operator side reports the received recorded result to the management server in the enterprise with the following report command:

SendViolationInfo (phone_IMSI, time, info).

It is apparent that those skilled in the art can make various variations and modifications to the present invention without departing from the scope of the present invention. If these modifications and variations to the present invention fall into the scope defined by the claims or the scope of any equivalent technique, the present invention is intended to cover these modifications and variations.

What is claimed is:

1. A method for managing a terminal device, comprising:
    setting, by a management side, management commands in an open mobile alliance (OMA) device management (DM) system;
    sending, by the management side, the management commands to a terminal device to be managed via a device management server, wherein the management commands are sent in the form of a device management tree; and
    obtaining, by the management side, executed results of the management commands from the terminal device,
    wherein the process of sending the management commands to a terminal device comprises:
    authenticating, by the device management server, the management commands, determining the management commands meet a device management protocol upon a successful authentication, and sending the management commands to the terminal device; or
    authenticating, by the device management server, the management commands, determining the management commands do not meet a device management protocol upon a successful authentication, translating, by the device management server, the management commands into commands meeting a device management protocol, and sending the translated management commands to the terminal device,
    wherein the sending, by the management side, the management commands to a terminal device to be managed via a device management server further comprises:
        sending by the management side, the management commands and information of target operation group users to the device management server;
        authenticating, by the device management server, the management commands and target operation group from a third party server; and
        sending, by the device management server, the management commands to target user terminal devices corresponding to the information of target operation group users.

2. The method according to claim 1, wherein the management commands comprise:
    to record use of additional functions of the terminal device; or
    to disable/enable additional functions of the terminal device.

3. The method according to claim 2, wherein the additional functions of the terminal device comprise at least one of:
    camera function of the terminal device with a camera;
    short-range wireless communication function of the terminal device with an infrared interface, and
    short-range wireless communication function of the terminal device with a Blue Tooth interface.

4. The method according to claim 1, further comprising setting
    a location-based triggering condition, for triggering execution of the management commands by current location of the terminal device.

5. The method according to claim 1, wherein the process of obtaining executed results of the management commands from the terminal device is implemented in the following mode:
    the device management server retrieves the executed results of the management commands from the terminal device.

6. The method according to claim 5, wherein the method further comprising:
    setting a triggering condition;
    when the triggering condition being met, each terminal device in the enterprise is triggered, executing the management commands, and reporting the executed results of the management commands to the management server in the enterprise through the DMS in accordance with a predetermined report policy.

7. The method according to claim 1, wherein the process of sending the management commands to a terminal device comprises:
    authenticating the management commands, determining the management commands do not meet a device management protocol upon a successful authentication, translating the management commands into commands meeting a device management protocol, and sending the translated management commands to the terminal device.

8. The method according to claim 1, wherein the management commands comprise recording use of additional functions of the terminal device.

9. The method according to claim 1, wherein the authenticating the management commands comprises:
   authenticating, by the device management server, the management commands from a management server in an enterprise; and
   wherein the sending the management commands to a terminal device comprises:
   sending, by the DMS, the management commands in accordance with IDs of users in the target user group.

10. A method for managing a terminal device, comprising:
    setting, by a management side, management commands in a based on an open mobile alliance (OMA) device management (DM) system;
    configuring, by the management side, a terminal device with the management commands, wherein the management commands are configured in the form of a device management tree; and
    obtaining, by the management side, executed results of the management commands from the terminal device; and
    authenticating, by a device management server, the management commands, determining the management commands meet a device management protocol upon a successful authentication, and sending, by the device management server, the management commands to the terminal device; or
    authenticating, by the device management server, the management commands, determining the management commands do not meet a device management protocol upon a successful authentication, translating, by the device management server, the management commands into commands meeting a device management protocol, and sending, by the device management server, the translated management commands to the terminal device;
    wherein the method further comprises:
        sending by the management side, the management commands and information of target operation group users to the device management server;
        authenticating, by the device management server, the management commands and target operation group from a third party server; and
        sending, by the device management server, the management commands to target user terminal devices corresponding to the information of target operation group users.

11. The method according to claim 10, wherein the process of obtaining executed results of the management commands from the terminal device is implemented in the following mode:
    the terminal device reports the executed results of the management commands to the device management server; or
    the device management server retrieves the executed results of the management commands from the terminal device.

12. The method according to claim 10, further comprising: updating and maintaining the management commands configured in the terminal device.

13. The method according to claim 10, wherein the management commands comprises:
    to record use of additional functions of the terminal device; or
    to disable/enable additional functions of the terminal device.

14. The method according to claim 13, wherein the additional functions of the terminal device comprise at least one of:
    camera function of the terminal device with a camera;
    short-range wireless communication function of the terminal device with an infrared interface, and
    short-range wireless communication function of the terminal device with a Blue Tooth interface.

15. The method according to claim 10, further comprising setting
    a location-based triggering condition, for triggering execution of the management commands by current location of the terminal device.

16. The method according to claim 10, wherein the process of obtaining executed results of the management commands from the terminal device is implemented in the following mode:
    the device management server retrieves the executed results of the management commands from the terminal device.

17. The method according to claim 10, wherein the management commands comprise recording use of additional functions of the terminal device.

18. A system for managing a terminal device, comprising: a management side and a device management server, wherein the management side is configured to execute the following steps: setting management commands in a based on an open mobile alliance (OMA) device management (DM) system; sending the management commands to a terminal device to be managed via a device management system, wherein the management commands are sent in the form of a device management tree; obtaining executed results of the management commands from the terminal device; and the device management server is configured to:
    authenticate the management commands, determine the management commands meet a device management protocol upon a successful authentication, and send the management commands to the terminal device; or
    authenticate the management commands, determine the management commands do not meet a device management protocol upon a successful authentication, translate the management commands into commands meeting a device management protocol, and send the translated management commands to the terminal device;
    wherein the management side is further configured to send the management commands and information of target operation group users to the device management server
    wherein the device management server is further configured to authenticate the management commands and target operation group from a third party server; and
    wherein the device management server is further configured to send the management commands to target user terminal devices corresponding to the information of target operation group users.

19. A system for managing a terminal device, comprising: a management side, a device management server and a terminal device, wherein the management side is configured to set management commands in an open mobile alliance (OMA) device management (DM) system; configure a terminal device with the management commands, wherein the management commands are configured in the form of a device management tree; and obtain executed results of the management commands from the terminal device; wherein the device management server is configuired to:

authenticate the management commands, determine the management commands meet a device management protocol upon a successful authentication, and send the management commands to the terminal device; or authenticate the management commands, determine the management commands do not meet a device management protocol upon a successful authentication, translate the management commands into commands meeting a device management protocol, and send the translated management commands to the terminal device;

wherein the management side is further configured to send the management commands and information of target operation group users to the device management server;

wherein the device management server is further configured to authenticate the management commands and target operation group from a third party server; and wherein the device management server is further configured to send the management commands to target user terminal devices corresponding to the information of target operation group users.

* * * * *